United States Patent [19]
Yoshizawa et al.

[11] Patent Number: 5,168,018

[45] Date of Patent: Dec. 1, 1992

[54] METHOD OF MANUFACTURING ZINC-ALKALINE BATTERIES

[75] Inventors: Hiroshi Yoshizawa; Akira Miura, both of Katano; Yoshiaki Nitta, Osaka; Sachiko Sugihara, Higashiosaka, all of Japan

[73] Assignee: Matsushita Electric Industrial Co., Ltd., Osaka, Japan

[21] Appl. No.: 698,912

[22] Filed: May 13, 1991

[30] Foreign Application Priority Data

| May 17, 1990 | [JP] | Japan | 2-128479 |
| May 17, 1990 | [JP] | Japan | 2-128480 |
| May 17, 1990 | [JP] | Japan | 2-128482 |
| May 17, 1990 | [JP] | Japan | 2-128484 |
| May 17, 1990 | [JP] | Japan | 2-128485 |

[51] Int. Cl.⁵ .............. B22F 9/08; C22C 18/00; H01M 4/40
[52] U.S. Cl. .................. 429/190; 429/192; 429/198; 429/206
[58] Field of Search .............. 429/190, 192, 198, 206

[56] References Cited

U.S. PATENT DOCUMENTS

| 3,847,669 | 11/1974 | Paterniti | 136/30 |
| 4,195,120 | 3/1980 | Rossler et al. | 429/50 |
| 4,592,974 | 6/1986 | Takeda et al. | |
| 4,606,984 | 8/1986 | Vignaud | |
| 4,735,870 | 4/1988 | Miura et al. | 429/206 |
| 4,735,876 | 5/1988 | Miura et al. | |
| 4,857,424 | 8/1989 | Larsen et al. | 429/206 |
| 4,861,688 | 8/1989 | Miura et al. | 429/206 |
| 4,920,020 | 4/1990 | Strauven et al. | 429/230 |
| 5,108,494 | 4/1992 | Uemura et al. | 429/206 |

FOREIGN PATENT DOCUMENTS

| 0205783 | 12/1986 | European Pat. Off. |
| 3923751 | 2/1990 | Fed. Rep. of Germany |
| 222984 | 5/1984 | Japan |
| 61-96666 | 5/1986 | Japan |
| 61-101955 | 5/1986 | Japan |
| 1105466 | 4/1989 | Japan |

OTHER PUBLICATIONS

Chemical Abstracts, vol. 111, No. 14, p. 55, abstract No. 116 486c, Oct. 2, 1989, Columbus, Ohio.
Chemical Abstracts, vol. 110, No. 24, p. 81, abstract No. 214 460p, Jun. 12, 1989, Columbus, Ohio.

*Primary Examiner*—Brian E. Hearn
*Assistant Examiner*—M. Nuzzolillo
*Attorney, Agent, or Firm*—Stevens, Davis, Miller & Mosher

[57] ABSTRACT

The present invention provides a method of manufacturing a mercury-free zinc-alkaline battery giving no environmental pollution and having an excellent shelf stability which comprises a corrosion-resistant zinc alloy as an anode active material, an indium compound having appropriate properties, an aqueous alkaline solution as an electrolyte and optionally a fluorine-containing surfactant having the specified chemical structure. The indium compound is indium hydroxide or indium sulfide prepared by neutralizing an aqueous solution of an indium salt. The surfactant has a hydrophilic part of a polyethylene oxide and an oleophilic part of a fluoroalkyl group. The zinc alloy contains a proper amount of at least one of the group of indium, lead, bismuth, lithium, calcium and aluminum. The indium hydroxide or indium sulfide is present in an amount of 0.005 to 0.5 wt % and the surfactant in an amount of 0.001 to 0.1 wt %, based on the weight of the zinc alloy, respectively. Furthermore, the indium hydroxide and indium sulfide in a powder form contain 60 wt % or more of particles having a particle size of 0.5 to 8 $\mu$m. The indium hydroxide has a weight loss of 18 to 30 wt % when thermally decomposed at up to 900° C. and a powdery X-ray diffraction pattern having peaks at 4.71±0.10 Å, 3.98±0.02 Å, 3.57±0.10 Å and 2.66±0.02 Å.

20 Claims, 1 Drawing Sheet

METHOD OF MANUFACTURING ZINC-ALKALINE BATTERIES

BACKGROUND OF THE INVENTION

The present invention relates to a method of manufacturing mercury-free zinc-alkaline batteries comprising zinc as an anode active material, an aqueous alkaline solution as an electrolyte, manganese dioxide as a cathode active material, silver oxide, oxygen, etc., which batteries have no adverse effect on environment and have an excellent shelf stability and discharge property.

DESCRIPTION OF RELATED ART

There has been a strong fear of environmental pollution due to mercury from used batteries for about ten years. Researches has been made on the reduction of the mercury content of alkaline batteries. As a result of the researches, corrosion resistant zinc alloys have been developed, which can reduce the mercury content of the alkaline batteries down to 250 ppm based on the weight of the batteries. However, as exemplified by a fear of the ozone layer destruction by chlorofluorocarbon gases, there is now the fear of world-wide environmental destruction by industrial products. Therefore, alkaline batteries completely free of mercury have still been demanded.

Efforts have been made to reduce the mercury content of alkaline batteries since alkaline batteries containing mercury added thereto were developed. Many patents and literatures have been issued or published, in which various materials such as inorganic inhibitors and organic inhibitors are disclosed.

Indium is known as a high hydrogen-overvoltage additive material for the anodes of secondary batteries as well as primary batteries. There are published many patent applications and literatures regarding methods of using these elements as alloying additives and methods of using the compounds of these elements as inorganic inhibitors.

For example, U.S. Pat. Nos. 4,735,876, 4,861,688 and 4,920,020, and Japanese Patent KOKOKU (Post-Exam. Publn.) No. Hei 2-22984 disclose methods of using the elements as the alloying additives; Japanese Patent KOKOKU (Post-Exam. Publn.) No. Sho 51-36450, Japanese Patent KOKAI (Laid-Open) No. Sho 49-93831, Japanese Patent KOKAI (Laid-Open) No. Sho 49-112125 disclose methods of adding indium oxide and indium hydroxide as the inorganic inhibitor; and Japanese Patent KOKAI (Laid-Open) No. Hei 1-105466 discloses a method of adding a mixture of indium oxide and cadmium oxide. Furthermore, Japanese Patent KOKAI (Laid-Open) Nos. Sho 61-96666 and 61-101955 disclose adding these elements as additives to the anodes of secondary batteries.

As the organic inhibitors, for example, U.S. Pat. No. 3,847,669 proposes ethylene oxide polymer. Furthermore, U.S. Pat. No. 4,195,120 discloses organic phosphate esters of the ethylene oxide-adduct type, and U.S. Pat. No. 4,606,984 discloses perfluorate organic compounds of the ethoxylated fluoro alcohol type.

As the mixed additive of an inorganic inhibitor and an organic inhibitor, for example, Japanese Patent KOKAI (Laid-Open) No. Hei 2-79367 proposes a mixture of indium hydroxide and a perfluorate organic compound of the ethoxylated fluoro alcohol type.

In prior art batteries such as a battery using pure zinc as the anode active material in the absence of mercury, a corrosion reaction violently occurs with hydrogen being generated by the zinc, whereby the inside pressure of battery is increased to expel the electrolyte outside the battery. Thus, there is a problem of electrolyte-leak.

In a partially-discharged battery, the hydrogen-generating rate at the zinc anode is accelerated, thereby further reducing the resistance to electrolyte-leak. This problem is caused by the removal of mercury which inhibits the corrosion reaction by raising the hydrogen overvoltage on the surface of zinc.

Even when a battery is made from a corrosion-resistant zinc alloy containing indium, aluminum and lead, which has been proved to render a mercury content-reduced zinc anode resistant to corrosion, without mercury, the electrolyte-leak resistance of the battery cannot be secured after partial discharging. Furthermore, even a battery made from a gel anode using a pure zinc powder as the anode active material and containing commercially available indium oxide and indium hydroxide added thereto, cannot have a practical electrolyte-leak resistance like the above-mentioned battery made from the corrosion resistant alloy.

Even when an amine type surfactant, which is known as a material for reducing the mercury content, is added as an organic inhibitor to a battery made from a gel anode using as the anode active material an indium, aluminum and lead-containing, corrosion-resistant zinc alloy, the electrolyte-leak resistance of the battery cannot be secured. As mentioned above, the current series of the batteries is not complete in inhibiting the corrosion and hence impractical at least in closed type ones.

SUMMARY OF THE INVENTION

The object of the present invention is to provide a method of manufacturing zinc-alkaline batteries free of environmental destruction and having an improved resistance to electrolyte-leak and a good storage stability.

In accordance with the present invention, these batteries are manufactured by incorporating a zinc alloy having an appropriate composition and indium hydroxide or indium sulfide synthesized to have suitable properties by an appropriate method, into a gel-like alkaline electrolyte.

The zinc-alkaline batteries having an inside pressure of battery inhibited from being raised by generation of gas due to the corrosion reaction can be obtained even without mercury by incorporating the zinc alloy having an appropriate composition and the indium hydroxide or indium sulfide synthesized to have suitable properties by an appropriate method and further incorporating an organic inhibitor.

That is, the invention provides a method of manufacturing a zinc-alkaline battery which comprises dispersing a zinc alloy powder as an active material in a gel-like alkaline electrolyte to prepare a gel-like anode. Said zinc alloy contains at least one alloying element of the group consisting of indium, lead, bismuth, lithium, calcium and aluminum, and said alkaline electrode contains powder of indium hydorxide or indium sulfide prepared from an indium salt as starting material by neutralizing an aqueous solution of said salt. Said indium hydroxide or indium sulfide is contained in an amount of 0.005 to 0.5wt % based on the weight of said zinc alloy.

The invention also provides a method of manufacturing a battery which comprises dispersing a zinc alloy powder as an active material in a gel-like alkaline electrolyte to prepare a gel-like anode. Said alloy contains at least one alloying element of the group consisting of indium, lead, bismuth, lithium, calcium and aluminum, and said alkaline electrolyte contains powder of indium hydroxide or indium sulfide prepared from an indium salt as starting material by neutralizing an aqueous solution of said salt. Said indium hydroxide or indium sulfide is contained in an amount of 0.005 to 0.5 wt % based on the weight of said zinc alloy. Further contained is a surfactant having a hydrophilic part of polyethylene oxide and an oleophilic part of a fluoroalkyl group in an amount of 0.001 to 0.1 wt % based on the weight of said zinc alloy.

DETAILED DESCRIPTION

In making it possible to realize mercury-free alkaline batteries, the present inventors have studied the most effective materials of the corrosion resistant zinc alloys, inorganic inhibitors and organic inhibitors, respectively, and the optimum added state and amounts of the materials.

The use of the corrosion-resistant zinc alloy in combination with the inorganic inhibitor in accordance with the present invention will be elucidated below. The gel-like anode used in the present invention is constituted by a gel-like alkaline electrolyte comprising a corrosion-resistant zinc alloy powder as an active material and containing an indium hydroxide powder having suitable properties dispersed therein in an appropriate concentration, the zinc alloy consisting of an appropriate amount of one or more selected from the group consisting of indium, lead, bismuth, lithium, calcium and aluminum and the balance of zinc.

The use of the corrosion-resistant zinc alloy in combination with the inorganic inhibitor and the organic inhibitor in accordance with the present invention will be elucidated below. The gel-like anode used in the present invention is constituted by a gel-like alkaline electrolyte comprising a corrosion-resistant zinc alloy powder as an active material, which contains an indium hydroxide powder having suitable properties dispersed therein in an appropriate concentration and further a so-called perfluoroalkyl polyethylene oxide surfactant as the organic inhibitor added thereto in an appropriate amount, the perfluoroalkyl polyethylene oxide having the hydrophilic part of polyethylene oxide and the oleophilic part of a fluoroalkyl group and the zinc alloy consisting of an appropriate amount of one or more selected from the group consisting of indium, lead, bismuth, lithium, calcium and aluminum and the balance of zinc.

Preferably, the zinc alloy contains 0.01-1 wt % of indium and 0.005-0.5 wt % in total of one or more of lead and bismuth, or 0.01-1 wt % of indium, 0.005-0.5 wt % of one or two of lead and bismuth and 0.005-0.2 wt % in total of one or more of lithium, calcium and aluminum.

The indium hydroxide used herein is preferably synthesized by neutralizing an aqueous solution of indium chloride or indium sulfate as the starting substance. The use of the indium chloride as the starting substance can produce an indium hydroxide having a better corrosion resistance than when the indium sulfate is used. Where the starting substance is indium nitrate and indium sulfate, the aqueous solution of them to be neutralized should contain chloride ions in order to effectively produce the indium hydroxide. The indium hydroxide is preferably in a powdery form, which contains at least 60 wt %, preferably at least 70 wt % of particles having a particle size of 0.5-8 μm and a weight loss of 18-30 wt %, preferably 20-25 wt % when thermally decomposed at a temperature of up to 900° C. The indium hydroxide effectively has a powdery X-ray diffraction pattern having broad peaks at
4.71±0.10 Å, 3.98±0.02 Å
3.57±0.10 Å, 2.66±0.02 Å
Further, the appropriate amount of the indium hydroxide added is in the range of 0.005 to 0.5 wt % based on the weight of the zinc alloy.

The amount of the abovementioned perfluoro-alkyl polyethylene oxide surfactant added to the alkaline electrolyte is effectively in the range of 0.001 to 0.1 wt % based on the weight of the zinc alloy. The chemical structure of the surfactant has the formula of wherein X is —H or —F, Y is —C$_2$H$_4$—O—CH$_2$CH(OH)—CH$_2$O—, —CONH— or SO$_2$NR—, wherein R is —H or an alkyl group, Z is —CH$_3$, —PO$_3$W$_2$ or —SO$_3$W, wherein W is an alkali metal, n is 4 to 10 and m is 20 to 100, or the formula of wherein X is —H or —F, Z is —CH$_3$, —PO$_3$W$_2$ or —SO$_3$W, wherein W is an alkali metal, n is 4 to 10 and m is 40 to 100.

The present inventors have studied the composition of each of the corrosion-resistant zinc alloy, inorganic inhibitor and organic inhibitor and the combination of these materials to provide the optimum effect and, as a result, they have found the optimum compositions and combinations. The mechanism to provide the optimum effect is now not clear, but the function of each of the alloying additive elements, inorganic inhibitor and organic inhibitor when used singly may be inferred as follows:

Of the additive elements in the zinc alloy, indium, lead and bismuth themselves have a high hydrogen overvoltage and hence raise the hydrogen overvoltage of the surface of the zinc alloy when added to the zinc alloy. The function of the elements raising the hydrogen overvoltage is maintained even when a fresh surface of the zinc alloy appears during the discharging, if the elements are uniformly dispersed in the body of the zinc alloy. Furthermore, lithium, aluminum and calcium have a function of sphering zinc grains to reduce the true specific surface area of the zinc grains so that the amount of the zinc alloy corroded per unit weight is decreased.

When the indium hydroxide powder is dispersed together with the zinc alloy into the gel-like alkaline electrolyte, part of the indium hydroxide is electrodeposited onto the surface of the zinc alloy through the principle of the substitution plating, thereby raising the hydrogen overvoltage on the surface. The remaining part of the indium hydroxide is retained as it is in a solid form in the gel-like alkaline electrolyte, and this part is to be electrodeposited onto a fresh surface of the zinc alloy exposed when subjected to discharging, thereby allowing the zinc alloy to remain to be corrosion resistant. The smaller the particle size of the indium hydroxide, the better the dispersion in the gel-like alkaline electrolyte, so that the indium hydroxide can be effective uniformly throughout the gel anode. However, if the indium hydroxide is too small, then it is immediately dissolved, so that the amount of the indium hydroxide to be used after partial discharging is insufficient. The limitation of the weight loss of the indium hydroxide when thermally decomposed depends upon the crystallinity thereof. The solubility of the indium hydroxide powder varies depending upon the weight loss. If the weight loss by the thermal decomposition is too small, then the solubility is lowered, and if the weight loss is too large, then the solubility is raised.

The properties of the indium hydroxide vary depending upon methods of synthesizing the indium hydroxide. The indium hydroxide synthesized from indium chloride and indium sulfate as starting materials has a crystallinity and crystal shape giving such an excellent corrosion resistance as mentioned above. The use of indium chloride as starting material produces much better indium hydroxide than the use of indium sulfate. Furthermore, the synthesis of an indium hydroxide having the same properties as those of the indium hydroxide synthesized from indium chloride as starting material is possible with indium nitrate and indium sulfate as starting materials by neutralizing in the presence of chloride ions.

When the surfactant is present in the alkaline electrolyte together with the zinc alloy, it is chemically adsorbed on the surface of the zinc alloy through the metal soap principle to form a hydrophobic monomolecular layer which exhibits the corrosion-inhibiting effect. From the viewpoint of molecular structure, the surfactant having polyethylene oxide at the hydrophilic portion thereof is highly soluble in a micell form in the alkaline electrolyte. Therefore, the surfactant rapidly transfers to and is immediately adsorbed on the surface of the zinc alloy, when it is charged into the electrolyte. This means that the surfactant provides a high corrosion resistance to the zinc alloy. The greater the polymerization degree of the polyethylene oxide, the higher the solubility of the surfactant. Then, when the surfactant has a highly hydrophobic fluoroalkyl group, the polymerization degree is desirably 20 or more. Furthermore, when the terminal of the polyethylene oxide is hydroxyl group or the oxide is in an alcohol form, the surfactant is susceptible to the hydrolysis. Therefore, the terminal group is preferably methyl group, sulfone group or phosphate group which is highly resistant to alkalis. If the oleophilic portion of the surfactant has a fluoroalkyl group, the group effectively prevents receiving and donating of electrons which causes the corrosion reaction, when the group is adsorbed on the surface of the zinc alloy. This is because the group is highly electrically insulating. The bond between the hydrophilic group and the oleophilic group preferably has a hydrophilic ether bond and hydroxyl group, rather than the water-repelling alkyl group, because the ether bond and hydroxyl group bond more easily to the zinc alloy, so that the surfactant provides higher corrosion resistance.

The advantages by the combination of the zinc alloy and the indium hydroxide will be elucidated below. Since the indium hydroxide is electrodeposited to work on the surface of the zinc alloy, the electrodeposition be effected smoothly and evenly. Since a large amount of hydrogen gas is generated on the surface of the zinc alloy having no corrosion resistance, the electrodeposition of indium is prevented, so that the electrodeposition is made uneven. However, the generation of hydrogen gas is inhibited on the surface of the corrosion-resistant zinc alloy, so that the electrodeposition is effected smoothly and evenly to obtain the desired combination advantages. These advantages are obtainable even after partial discharging.

The advantages by the combination of the zinc alloy, the indium hydroxide and the surfactant will be elucidated below. The function and advantages of the indium hydroxide are as described above, but they are lost if the whole of the indium hydroxide is electrode-posited when partially discharged. Therefore, the addition of the surfactant does not only provide the anti-corrosion effect but also inhibits the electrodeposition of an amount beyond the necessary amount of the indium hydroxide to retain the amount of the indium hydroxide needed after the partial discharging.

The process for making the corrosion-resistant zinc alloy, the processes for synthesizing the indium hydroxide and indium sulfide, the structure of an LR 6 alkaline manganese battery and the method of evaluating the resistance to electrolyte leak will be explained below.

The corrosion-resistant zinc alloy powder is made by a so-called atomizing method in which zinc of 99.97% in purity is molten, predetermined additive elements are added in predetermined amounts to the melt, the melt is rendered uniform and then the melt is atomized by compressed air. The resulting particles are classified to be within the range of 45-150 mesh.

The indium hydroxide is synthesized by adding a saturated amount of a predetermined indium salt to ion-exchange water, rapidly neutralizing the resulting aqueous solution with ammonia gas as a neutralizing agent under stirring with a screw stirrer by adding the ammonia gas to the solution until the pH of the solution becomes 9, then washing the precipitate on a filter having a mesh size of 0.5 $\mu$m with ion-exchange water until the pH of the filtrate becomes 7.5, separating the water content from the precipitate by making vacuum underneath the filter and drying the precipitate under vacuum at a relatively low temperature of 60° C. The indium hydroxide has a powdery X-ray diffraction pattern having broad peaks at 4.71±0.10 Å, 3.98±0.02 Å, 3.57±0.10 Å and 2.66±0.02 Å.

The indium sulfide is synthesized by adding a saturated amount of a predetermined indium salt to ion-exchange water, rapidly neutralizing the resulting aqueous solution with hydrogen sulfide as a neutralizing agent under stirring with a screw stirrer by adding the ammonia gas to the solution until the pH of the solution becomes 9, then washing the precipitate on a filter having a mesh size of 0.5 $\mu$m with ion-exchange water until the pH of the filtrate becomes 7.5, separating the water content from the precipitate by making vacuum underneath the filter and drying the precipitate under vacuum at a relatively low temperature of 60° C.

The gel-like anode is prepared in a manner as described below. To a 40% potassium hydroxide aqueous solution (also containing 3 wt % of ZnO) are added 3 wt % of sodium polyacrylate and 1 wt % of carboxymethyl cellulose to form a gel-like electrolyte. To the gel-like electrolyte is gradually added a predetermined amount of an indium hydroxide or indium sulfide powder under stirring. The electrolyte is then aged for 2-3 hours. Then, the zinc alloy powder is mixed with the aged gel-like electrolyte in such a weight ratio that the amount of the former is two times larger than that of the gel-like electrolyte. In the case that the organic inhibitor is added, a predetermined amount of the inhibitor is added to the gel-like electrolyte prior to adding the indium hydroxide during the abovementioned preparation of the indium hydroxide.

Figure 1:
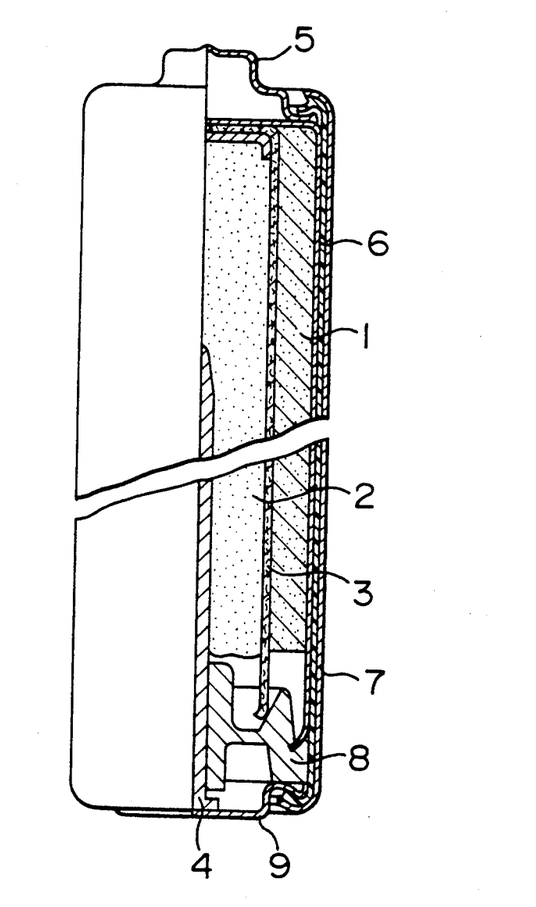
The drawing is a half cross-sectional view of an alkaline manganes battery in an example of the present invention.

FIG. 1 is a cross-sectional view of the LR 6 alkaline manganese battery used in the example of the present invention. In this figure, reference number 1 denotes a cathode compound, 2 a gel-like anode featuring the present invention, 3 a separator, 4 a current collector of the gel-like anode, 5 a cathode terminal cap, 6 a metal case, 7 an outside housing of the battery, 8 a polyethylene-made resin plug for closing the opening of the case 6, and 9 a bottom plate forming the anode terminal.

In the method of evaluating the resistance to electrolyte leak, 100 of the LR 6 alkaline manganese batteries having the structure as shown in FIG. 1 were subjected to partial discharging at a constant current of 0.85 A and a discharging voltage of 0.75 V which are severe to the LR 6 battery until 20% of the discharge capacity of the batteries was discharged, and the number of leaked batteries after storage at 60° C. for 30 days or more was evaluated as the leak index (%). If the leak index is zero (0) % after storage at 60° C. for 30 days under the severe conditions, the batteries are practically usable. However, the leak index representing the reliability of battery should be kept zero as long as possible.

The present invention will be illustrated below with reference to some examples.

EXAMPLE 1

This example is an embodiment using the combination of a zinc alloy and an inorganic inhibitor.

The previous research of various additive elements with changed amounts thereof has found that zinc alloys containing one or more of indium, lead, bismuth, lithium, calcium and aluminum are appropriate.

Table 1 shows the results of the leak test for batteries made from the corrosion-resistant zinc alloys as mentioned above with changed amounts of indium hydroxide added. The leak test was carried out with the batteries stored at 60° C. for 30 days.

Table 2 shows the results of the leak test for batteries prepared from the corrosion-resistant zinc alloys as mentioned above with changed amounts of indium sulfide added. The leak test was carried out with the batteries stored at 60° C. for 60 days.

TABLE 1

Effect of added amounts of indium hydroxide in the combination of zinc alloys and indium hydroxide

| | | | | | | % Leak index (stored at 60° C. for 30 days) | | | | | | |
|---|---|---|---|---|---|---|---|---|---|---|---|---|
| | | | | | | Inhibitor free (Comp.) | Amount of indium sulfide (wt % of zinc alloy) | | | | | |
| | Additive elements (wt %) | | | | | | | | | | | |
| No. | In | Pb | Bi | Al | Ca | 0 | 0.001 | 0.005 | 0.01 | 0.05 | 0.1 | 0.5 | 1.0 |
| 1 | 0.5 | 0.2 | 0 | 0 | 0 | 47 | 18 | 0 | 0 | 0 | 0 | 0 | 14 |
| 2 | 0.5 | 0 | 0.05 | 0 | 0 | 30 | 21 | 0 | 0 | 0 | 0 | 0 | 13 |
| 3 | 0.2 | 0.1 | 0.05 | 0 | 0 | 28 | 17 | 0 | 0 | 0 | 0 | 0 | 12 |
| 4 | 0.2 | 0.1 | 0 | 0.02 | 0 | 37 | 19 | 0 | 0 | 0 | 0 | 0 | 13 |
| 5 | 0.2 | 0.1 | 0 | 0 | 0.02 | 28 | 15 | 0 | 0 | 0 | 0 | 0 | 11 |
| 6 | 0.2 | 0 | 0.05 | 0.02 | 0 | 26 | 19 | 0 | 0 | 0 | 0 | 0 | 16 |
| 7 | 0.2 | 0 | 0.05 | 0 | 0.02 | 19 | 8 | 0 | 0 | 0 | 0 | 0 | 10 |
| 8 | 0.2 | 0.1 | 0.05 | 0.02 | 0 | 16 | 15 | 0 | 0 | 0 | 0 | 0 | 10 |
| 9 | 0.2 | 0.1 | 0.05 | 0 | 0.02 | 11 | 9 | 0 | 0 | 0 | 0 | 0 | 12 |
| 10 | 0.2 | 0.1 | 0.05 | 0.01 | 0.01 | 12 | 7 | 0 | 0 | 0 | 0 | 0 | 17 |

TABLE 2

Effect of added amounts of indium hydroxide on batteries using the combination of zinc alloys and indium sulfide

| | | | | | | % Leak index (stored at 60° C. for 60 days) | | | | | | |
|---|---|---|---|---|---|---|---|---|---|---|---|---|
| | | | | | | Inhibitor free (Comp.) | Amount of indium sulfide (wt % of zinc alloy) | | | | | |
| | Additive elements (wt %) | | | | | | | | | | | |
| No. | In | Pb | Bi | Al | Ca | 0 | 0.001 | 0.005 | 0.01 | 0.05 | 0.1 | 0.5 | 1.0 |
| 11 | 0.5 | 0.2 | 0 | 0 | 0 | 57 | 32 | 0 | 0 | 0 | 0 | 0 | 22 |
| 12 | 0.5 | 0 | 0.05 | 0 | 0 | 52 | 30 | 0 | 0 | 0 | 0 | 0 | 23 |
| 13 | 0.2 | 0.1 | 0.05 | 0 | 0 | 44 | 22 | 0 | 0 | 0 | 0 | 0 | 11 |
| 14 | 0.2 | 0.1 | 0 | 0.02 | 0 | 42 | 16 | 0 | 0 | 0 | 0 | 0 | 12 |
| 15 | 0.2 | 0.1 | 0 | 0 | 0.02 | 41 | 15 | 0 | 0 | 0 | 0 | 0 | 8 |
| 16 | 0.2 | 0 | 0.05 | 0.02 | 0 | 38 | 14 | 0 | 0 | 0 | 0 | 0 | 13 |
| 17 | 0.2 | 0 | 0.05 | 0 | 0.02 | 32 | 13 | 0 | 0 | 0 | 0 | 0 | 10 |
| 18 | 0.2 | 0.1 | 0.05 | 0.02 | 0 | 34 | 15 | 0 | 0 | 0 | 0 | 0 | 14 |
| 19 | 0.2 | 0.1 | 0.05 | 0 | 0.02 | 33 | 16 | 0 | 0 | 0 | 0 | 0 | 9 |
| 20 | 0.2 | 0.1 | 0.05 | 0.01 | 0.01 | 39 | 17 | 0 | 0 | 0 | 0 | 0 | 11 |

From Tables 1 and 2 it is seen that the addition of each of indium hydroxide and indium sulfide in an appropriate amount gives an excellent electrolyte-leak resistance, although no practical electrolyte-leak resistance can be given with a zinc alloy alone even if the zinc alloy has an excellent corrosion resistance. The amount of the indium hydroxide and indium sulfide added were preferably in the range of 0.005 to 0.5 wt % based on the weight of the zinc alloy.

The indium sulfide is hydrolyzed in the alkaline electrolyte to form indium hydroxide and sulfur. This sulfur is reacted with zinc to give anticorrosion. Therefore, an alkali metal sulfide and indium hydroxide may be used in combination to obtain the same effect.

The amount of the alkali metal sulfide added is preferably in the range of 0.002 to 0.2 wt % based on the weight of the zinc alloy.

Table 3 shows the results of the leak test for batteries prepared using an unchanged indium hydroxide amount of 0.1 wt % and changed amounts of the alloying additives. The leak test was carried out with the batteries stored at 60° C. for 30 days.

TABLE 3

Effect of alloy compositions on batteries using the combination of zinc alloys and indium hydroxide

| No. | In | Pb | Bi | Al | Ca | % Leak index (stored at 60° C. for 30 days) Amount of indium hydroxide 0.1 wt % of zinc alloy |
|---|---|---|---|---|---|---|
| 21 | 0.01 | 0.1 | 0.05 | 0 | 0 | 0 |
| 22 | 0.05 | 0.1 | 0.05 | 0 | 0 | 0 |
| 23 | 0.5 | 0.1 | 0.05 | 0 | 0 | 0 |
| 24 | 1.0 | 0.1 | 0.05 | 0 | 0 | 0 |
| 25 | 0.2 | 0 | 0.005 | 0 | 0 | 0 |
| 26 | 0.2 | 0 | 0.5 | 0 | 0 | 0 |
| 27 | 0.2 | 0.005 | 0 | 0 | 0 | 0 |
| 28 | 0.2 | 0.5 | 0 | 0 | 0 | 0 |
| 29 | 0.2 | 0.0025 | 0.0025 | 0 | 0 | 0 |
| 30 | 0.2 | 0.25 | 0.25 | 0 | 0 | 0 |
| 31 | 0.01 | 0 | 0.05 | 0 | 0.02 | 0 |
| 32 | 0.05 | 0 | 0.05 | 0 | 0.02 | 0 |
| 33 | 0.5 | 0 | 0.05 | 0 | 0.02 | 0 |
| 34 | 1.0 | 0 | 0.05 | 0 | 0.02 | 0 |
| 35 | 0.2 | 0 | 0.005 | 0 | 0.02 | 0 |
| 36 | 0.2 | 0 | 0.5 | 0 | 0.02 | 0 |
| 37 | 0.2 | 0 | 0.05 | 0.0025 | 0.0025 | 0 |
| 38 | 0.2 | 0 | 0.05 | 0.1 | 0.1 | 0 |
| 39 | 0.2 | 0.0025 | 0.0025 | 0.01 | 0.01 | 0 |
| 40 | 0.2 | 0.25 | 0.25 | 0.01 | 0.01 | 0 |
| 41 | 0.2 | 0.1 | 0.05 | 0.0025 | 0.0025 | 0 |
| 42 | 0.2 | 0.1 | 0.05 | 0.1 | 0.1 | 0 |

From Table 3 it is seen that the amounts of additives added to the zinc alloy are suitably in the range of 0.01 to 1 wt % for indium, 0.005 to 0.5 wt % for each or two of lead and bismuth, or 0.005 to 0.2 wt % for each or two of calcium and aluminum. Furthermore, the same effect may be obtained by substituting lithium for the aluminum.

This example employed an indium hydroxide prepared by neutralizing an aqueous solution of indium sulfate as the starting material. Similar effect may be obtained by employing an indium hydroxide prepared by using indium chloride or indium nitrate. The higher effect was obtained by using each indium hydroxide prepared with the chloride, sulfide and nitrate as the starting material in this order.

Substitution of indium sulfide for indium hydroxide obtained almost the same effect.

EXAMPLE 2

This example elucidates the effect of the starting materials for preparing the indium hydroxide in the combination of the zinc alloy and the inorganic inhibitor.

Table 4 shows the results of leak test for batteries using 0.1 wt % based on the weight of the zinc alloy of indium hydroxide prepared from various starting materials. The leak test was carried out with the batteries stored at 60° C. for 45 days.

TABLE 4

Effect of starting materials for preparing indium hydroxide on batteries using the combination of zinc alloys and indium hydroxide

| | Additive elements (wt %) | | | | | % Leak index (stored at 60° C. for 45 days) Amount of indium hydroxide 0.1 wt % of zinc alloy | | | | |
|---|---|---|---|---|---|---|---|---|---|---|
| No. | In | Pb | Bi | Al | Ca | nitrate | chloride | sulfate | sulfate + chloride ions | nitrate + chloride ions |
| 43 | 0.5 | 0 | 0.05 | 0 | 0 | 17 | 0 | 0 | 0 | 0 |
| 44 | 0.2 | 0.1 | 0.05 | 0 | 0 | 16 | 0 | 0 | 0 | 0 |
| 45 | 0.2 | 0 | 0.05 | 0 | 0 | 19 | 0 | 0 | 0 | 0 |
| 46 | 0.2 | 0 | 0.05 | 0.02 | 0.02 | 17 | 0 | 0 | 0 | 0 |
| 47 | 0.2 | 0.1 | 0.05 | 0 | 0.02 | 15 | 0 | 0 | 0 | 0 |
| 48 | 0.2 | 0.1 | 0.05 | 0.01 | 0.01 | 12 | 0 | 0 | 0 | 0 |

From Table 4 it is seen that indium hydroxide from the nitrate is effective if it is prepared in the presence of chloride ions. That is, a battery with indium hydroxide prepared from the nitrate as starting material had a leak index of 0% even after storing at 60° C. for 30 days, which revealed that the battery is of practical use. However, it is seen that indium hydroxide from the chloride or sulfate as starting material is more reliable for a longer period since a battery with the indium hydroxide had a leak index of 0% after storing at 60° C. for 45 days.

Substitution of indium sulfide for indium hydroxide obtained almost the same effect.

EXAMPLE 3

This example studied on the effect of the particle size of indium hydroxide with batteries using the combination of zinc alloys and the indium hydroxide as inorganic inhibitor.

Table 5 shows the results of leak test with batteries using indium hydroxide powders having various particle size distributions. The indium hydroxide powders were added in an amount of 0.1 wt % based on the weight of zinc alloy. The leak test was carried out with the batteries stored at 60° C. for 45 days.

TABLE 5

Effect of the particle size distribution of indium hydroxide on batteries using the combination of zinc alloys and indium hydroxide

| | Additive elements (wt %) | | | | | % Leak index (stored at 60° C. for 45 days) Amount of indium hydroxide 0.1 wt % of zinc alloy Amount of particles of 0.5-8 μm (wt %) | | | |
|---|---|---|---|---|---|---|---|---|---|
| No. | In | Pb | Bi | Al | Ca | 40 | 60 | 70 | 80 |
| 49 | 0.5 | 0 | 0.05 | 0 | 0 | 19 | 0 | 0 | 0 |
| 50 | 0.2 | 0.1 | 0.05 | 0 | 0 | 10 | 0 | 0 | 0 |
| 51 | 0.2 | 0 | 0.05 | 0.02 | 0 | 11 | 0 | 0 | 0 |
| 52 | 0.2 | 0 | 0.05 | 0 | 0.02 | 10 | 0 | 0 | 0 |
| 53 | 0.2 | 0.1 | 0.05 | 0 | 0.02 | 10 | 0 | 0 | 0 |
| 54 | 0.2 | 0.1 | 0.05 | 0.01 | 0.01 | 12 | 0 | 0 | 0 |

From Table 5 it is seen that an indium hydroxide powder is preferred to contain 60 wt % or more of particles of 0.5 to 8 μm in size (the balance is particles having a size of 0.5 μm or larger, because the powder on a filter having a mesh of 0.5 μm was washed with water). There may be such a case that batteries with 70 wt % or more of the particles do not leak any amount of electrolyte even after storing at 60° C. for 60 days.

The indium hydroxide used in this example was one prepared with indium nitrate as starting material and obtained through the classification of particles having a larger size by a wet settling method Substitution of indium sulfide for indium hydroxide obtained almost the same effect.

EXAMPLE 4

This example studied on the effect of the weight loss of indium hydroxide when thermally decomposed on batteries using the combination of zinc alloys and indium hydroxide.

Table 6 shows the results of leak test for batteries using 0.1 wt % of various indium hydroxides having different weight losses when thermally decomposed at up to 900° C. added to the zinc alloys. The leak test was carried out for the batteries stored at 60° C. for 45 days.

TABLE 6

Effect of the weight loss of indium hydroxide when thermally decomposed on batteries using the combination of zinc alloys and indium hydroxide

| | Additive elements (wt %) | | | | | % Leak index (stored at 60° C. for 45 days) Amount of indium hydroxide 0.1 wt % of zinc alloy Weight loss of indium hydroxide when thermally decomposed (wt %) | | | | | | |
|---|---|---|---|---|---|---|---|---|---|---|---|---|
| No. | In | Pb | Bi | Al | Ca | 35 | 30 | 25 | 22 | 20 | 18 | 16 |
| 55 | 0.5 | 0 | 0.05 | 0 | 0 | 18 | 0 | 0 | 0 | 0 | 0 | 19 |
| 56 | 0.2 | 0.1 | 0.05 | 0 | 0 | 21 | 0 | 0 | 0 | 0 | 0 | 17 |
| 57 | 0.2 | 0 | 0.05 | 0.02 | 0 | 10 | 0 | 0 | 0 | 0 | 0 | 10 |
| 58 | 0.2 | 0 | 0.05 | 0 | 0.02 | 15 | 0 | 0 | 0 | 0 | 0 | 11 |
| 59 | 0.2 | 0.1 | 0.05 | 0 | 0.02 | 11 | 0 | 0 | 0 | 0 | 0 | 8 |
| 60 | 0.2 | 0.1 | 0.05 | 0.01 | 0.01 | 10 | 0 | 0 | 0 | 0 | 0 | 7 |

From Table 6 it is seen that the indium hydroxide is preferred to have a weight loss of 18 to 30 wt % when thermally decomposed. No leak may occur with use of the indium hydroxide having a weight loss of 20 to 25 wt % even after storing at 60° C. for 60 days.

The different weight losses of the indium hydroxide used in this example were changed by using the chloride as starting material and changing the neutralizing time.

EXAMPLE 5

This example concerns batteries using the combination of zinc alloys, indium hydroxide as inorganic inhibitor and a surfactant as organic inhibitor.

Table 7 shows the results of leak test for the batteries in which the amount of the indium hydroxide added was 0.1 wt % based on the weight of the zinc alloys and the amount of the surfactant was changed. The leak test was carried out with the batteries stored at 60° C. for 60 days.

TABLE 7

Effect of the amount of a surfactant on batteries using the combination of zinc alloys, indium hydroxide and surfactant

| | Additive elements (wt %) | | | | | % Leak index (stored at 60° C. for 60 days) Amount of indium hydroxide 0.1 wt % of zinc alloy Amount of surfactant (wt % of zinc alloy) | | | | | | |
|---|---|---|---|---|---|---|---|---|---|---|---|---|
| No. | In | Pb | Bi | Al | Ca | 0.0005 | 0.001 | 0.005 | 0.01 | 0.05 | 0.1 | 0.2 |
| 61 | 0.5 | 0.2 | 0 | 0 | 0 | 19 | 0 | 0 | 0 | 0 | 0 | 21 |
| 62 | 0.5 | 0 | 0.05 | 0 | 0 | 30 | 0 | 0 | 0 | 0 | 0 | 14 |
| 63 | 0.2 | 0.1 | 0.05 | 0 | 0 | 12 | 0 | 0 | 0 | 0 | 0 | 34 |
| 64 | 0.2 | 0.1 | 0 | 0.02 | 0 | 16 | 0 | 0 | 0 | 0 | 0 | 21 |
| 65 | 0.2 | 0.1 | 0 | 0 | 0.02 | 15 | 0 | 0 | 0 | 0 | 0 | 14 |
| 66 | 0.2 | 0 | 0.05 | 0.02 | 0 | 14 | 0 | 0 | 0 | 0 | 0 | 18 |

TABLE 7-continued

Effect of the amount of a surfactant on batteries using the combination of zinc alloys, indium hydroxide and surfactant

| | Additive elements (wt %) | | | | % Leak index (stored at 60° C. for 60 days) Amount of indium hydroxide 0.1 wt % of zinc alloy Amount of surfactant (wt % of zinc alloy) | | | | | | |
|---|---|---|---|---|---|---|---|---|---|---|---|
| No. | In | Pb | Bi | Al | Ca | 0.0005 | 0.001 | 0.005 | 0.01 | 0.05 | 0.1 | 0.2 |
| 67 | 0.2 | 0 | 0.05 | 0 | 0.02 | 13 | 0 | 0 | 0 | 0 | 0 | 13 |
| 68 | 0.2 | 0.1 | 0.05 | 0.02 | 0 | 15 | 0 | 0 | 0 | 0 | 0 | 17 |
| 69 | 0.2 | 0.1 | 0.05 | 0 | 0.02 | 16 | 0 | 0 | 0 | 0 | 0 | 6 |
| 70 | 0.2 | 0.1 | 0.05 | 0.01 | 0.01 | 17 | 0 | 0 | 0 | 0 | 0 | 8 |

From Table 7 it is seen that the amount of the surfactant is preferred to be in the range of 0.001 to 0.1 wt % based on the weight of the zinc alloys.

Table 8 shows the results of leak test for batteries using the amount of the surfactant fixed to 0.01 wt % and the changed amounts of indium hydroxide. The leak test was carried out with the batteries stored at 60° C. for 60 days.

Table 9 shows the results of leak test for batteries using the amount of the surfactant fixed to 0.01 wt % and the changed amounts of indium sulfide. The leak test was carried out with the batteries stored at 60° C. for 75 days.

Table 10 shows the results of leak test for batteries in which the amount of the surfactant was 0.01 wt % and the amount of indium hydroxide was 0.1 wt % based on the weight of the zinc alloy, and the kinds and the amounts of the alloying additives were changed. The leak test was carried out with the batteries stored at 60° C. for 60 days.

TABLE 8

Effect of the amount of indium hydroxide added to batteries using the combination of zinc alloys, indium hydroxide and surfactant

| | Additive elements (wt %) | | | | % Leak index (stored at 60° C. for 60 days) Amount of surfactant 0.01 wt % of zinc alloy Amount of indium hydroxide (wt % of zinc alloy) | | | | | | |
|---|---|---|---|---|---|---|---|---|---|---|---|
| No. | In | Pb | Bi | Al | Ca | 0.001 | 0.005 | 0.01 | 0.05 | 0.1 | 0.5 | 1.0 |
| 71 | 0.5 | 0.2 | 0 | 0 | 0 | 19 | 0 | 0 | 0 | 0 | 0 | 12 |
| 72 | 0.5 | 0 | 0.05 | 0 | 0 | 30 | 0 | 0 | 0 | 0 | 0 | 14 |
| 73 | 0.2 | 0.1 | 0.05 | 0 | 0 | 29 | 0 | 0 | 0 | 0 | 0 | 9 |
| 74 | 0.2 | 0.1 | 0 | 0.02 | 0 | 35 | 0 | 0 | 0 | 0 | 0 | 11 |
| 75 | 0.2 | 0.1 | 0 | 0 | 0.02 | 26 | 0 | 0 | 0 | 0 | 0 | 7 |
| 76 | 0.2 | 0 | 0.05 | 0.02 | 0 | 22 | 0 | 0 | 0 | 0 | 0 | 11 |
| 77 | 0.2 | 0 | 0.05 | 0 | 0.02 | 19 | 0 | 0 | 0 | 0 | 0 | 8 |
| 78 | 0.2 | 0.1 | 0.05 | 0.02 | 0 | 19 | 0 | 0 | 0 | 0 | 0 | 11 |
| 79 | 0.2 | 0.1 | 0.05 | 0 | 0.02 | 16 | 0 | 0 | 0 | 0 | 0 | 8 |
| 80 | 0.2 | 0.1 | 0.05 | 0.01 | 0.01 | 17 | 0 | 0 | 0 | 0 | 0 | 4 |

TABLE 9

Effect of the amount of indium sulfate added to batteries using the combination of zinc alloys, indium sulfide and surfactant

| | Additive elements (wt %) | | | | % Leak index (stored at 60° C. for 75 days) Amount of surfactant 00.1 wt % of zinc alloy Amount of indium hydroxide (wt % of zinc alloy) | | | | | | |
|---|---|---|---|---|---|---|---|---|---|---|---|
| No. | In | Pb | Bi | Al | Ca | 0.001 | 0.005 | 0.01 | 0.05 | 0.1 | 0.5 | 1.0 |
| 81 | 0.5 | 0.2 | 0 | 0 | 0 | 29 | 0 | 0 | 0 | 0 | 0 | 25 |
| 82 | 0.5 | 0 | 0.05 | 0 | 0 | 32 | 0 | 0 | 0 | 0 | 0 | 27 |
| 83 | 0.2 | 0.1 | 0.05 | 0 | 0 | 16 | 0 | 0 | 0 | 0 | 0 | 21 |
| 84 | 0.2 | 0.1 | 0 | 0.02 | 0 | 18 | 0 | 0 | 0 | 0 | 0 | 19 |
| 85 | 0.2 | 0.1 | 0 | 0 | 0.02 | 16 | 0 | 0 | 0 | 0 | 0 | 15 |
| 86 | 0.2 | 0 | 0.05 | 0.02 | 0 | 17 | 0 | 0 | 0 | 0 | 0 | 17 |
| 87 | 0.2 | 0 | 0.05 | 0 | 0.02 | 15 | 0 | 0 | 0 | 0 | 0 | 14 |
| 88 | 0.2 | 0.1 | 0.05 | 0.02 | 0 | 18 | 0 | 0 | 0 | 0 | 0 | 18 |
| 89 | 0.2 | 0.1 | 0.05 | 0 | 0.02 | 19 | 0 | 0 | 0 | 0 | 0 | 19 |
| 90 | 0.2 | 0.1 | 0.05 | 0.01 | 0.01 | 20 | 0 | 0 | 0 | 0 | 0 | 14 |

From Table 8 and 9 it is seen that the amounts of indium hydroxide and indium sulfide added are suitably in the range of 0.005 to 0.5 wt %.

TABLE 10

Effect of the alloy compositions on batteries using the combination of zinc alloys, indium hydroxide and surfactant

| No. | Additive elements (wt %) | | | | | % Leak index (stored at 60° C. for 60 days) Amount of surfactant 0.01 wt % of zinc alloy Amount of indium hydroxide 0.1 (wt % of zinc alloy) |
|---|---|---|---|---|---|---|
|  | In | Pb | Bi | Al | Ca |  |
| 91 | 0.01 | 0.1 | 0.05 | 0 | 0 | 0 |
| 92 | 0.03 | 0.1 | 0.05 | 0 | 0 | 0 |
| 93 | 0.5 | 0.1 | 0.05 | 0 | 0 | 0 |
| 94 | 1.0 | 0.1 | 0.05 | 0 | 0 | 0 |
| 95 | 0.2 | 0 | 0.005 | 0 | 0 | 0 |
| 96 | 0.2 | 0 | 0.5 | 0 | 0 | 0 |
| 97 | 0.2 | 0.005 | 0 | 0 | 0 | 0 |
| 98 | 0.2 | 0.5 | 0 | 0 | 0 | 0 |
| 99 | 0.2 | 0.0025 | 0.0025 | 0 | 0 | 0 |
| 100 | 0.2 | 0.25 | 0.25 | 0 | 0 | 0 |
| 101 | 0.01 | 0 | 0.05 | 0 | 0.02 | 0 |
| 102 | 0.05 | 0 | 0.05 | 0 | 0.02 | 0 |
| 103 | 0.5 | 0 | 0.05 | 0 | 0.02 | 0 |
| 104 | 1.0 | 0 | 0.05 | 0 | 0.02 | 0 |
| 105 | 0.2 | 0 | 0.005 | 0 | 0.02 | 0 |
| 106 | 0.2 | 0 | 0.5 | 0 | 0.02 | 0 |
| 107 | 0.2 | 0 | 0.05 | 0.0025 | 0.0025 | 0 |
| 108 | 0.2 | 0 | 0.05 | 0.1 | 0.1 | 0 |
| 109 | 0.2 | 0.0025 | 0.0025 | 0.01 | 0.01 | 0 |
| 110 | 0.2 | 0.25 | 0.25 | 0.01 | 0.01 | 0 |
| 111 | 0.2 | 0.1 | 0.05 | 0.0025 | 0.0025 | 0 |
| 112 | 0.2 | 0.1 | 0.05 | 0.1 | 0.1 | 0 |

From Table 10 it is seen that the amounts of the additives are suitably in the range of 0.01 to 1 wt % for indium, 0.005 to 0.5 wt % for each or two of lead and bismuth or 0.005 to 0.2 wt % for each or two of calcium and aluminum. Furthermore, substitution of lithium for the aluminum could obtain the same effect.

In this example, it is seen that the leak resistance of the battery using the surfactant is much improved over the battery free of the surfactant. Substitution of indium sulfide for indium hydroxide obtained almost the same effect.

The surfactant used in EXAMPLE 5 was a perfluoroalkyl polyethylene oxide surfactant having the following formula of $$(X)-C_nF_{2n}-(Y)-(CH_2CH_2O)_m-(Z)$$

wherein X is —F, Y is —$C_2H_4$—O—$CH_2CH(OH)$—$CH_2$—, Z is —$CH_3$, n is 9 and m is 60. Similar effects can be obtained with a surfactant represented by the formula of $$(X)-C_nF_{2n}-(Y)-(CH_2CH_2O)_m-(Z)$$

wherein X is —H or —F, Y is —$C_2H_4$—O—$CH_2CH(OH)$—$CH_2O$—, —CONH— or —$SO_2NR$—wherein R is —H or an alkyl group, Z is —$CH_3$, —$PO_3W_2$ or —$SO_3W$ wherein W is an alkali metal, n is in the range of 4 to 10 and m is in the range of 20 to 100, or $$(X)-C_nF_{2n}-(CH_2CH_2)-(CH_2CH_2O)_m-(Z)$$

wherein X is —H or —F, Z is —$CH_3$, —$PO_3W_2$ or —$SO_3W$ wherein W is an alkali metal, n is in the range of 4 to 10 and m is in the range of 40 to 100.

Powders of the indium hydroxide and the indium sulfide used were prepared from the sulfate as starting material and contained 80 wt % or more of the particles of the hydroxide and the sulfide having a particle size of 0.5 to 8 μm. Sufficient resistance to the electrolyte leak was confirmed to be obtained with indium hydroxide prepared from the same starting materials and having the same properties as those of EXAMPLES 2, 3 and 4 above.

In all the examples above it was confirmed that the desired effect can be obtained with batteries free of mercury but the same effect can be obtained with batteries containing several or several tens of ppm of mercury added thereto.

What is claimed is:

1. A method of manufacturing a zinc-alkaline battery, which comprises dispersing a zinc alloy powder as an active material in a gel-like alkaline electrolyte to prepare a gel-like anode, said zinc alloy containing at least one alloying element selected from the group consisting of indium, lead, bismuth, lithium, calcium and aluminum and said alkaline electrolyte containing indium hydroxide or indium sulfide prepared from a indium salt as starting material by neutralizing an aqueous solution of said salt, said indium hydroxide or indium sulfide being contained in an amount of 0.005 to 0.5 wt % based on the weight of said zinc alloy.

2. A method according to claim 1, wherein the zinc alloy containing 0.01 to 1 wt % of indium and 0.005 to 0.5 wt % in total of one or two of lead and bismuth is used as the anode active material.

3. A method according to claim 1, wherein the zinc alloy containing 0.01 to 1 wt % of indium, 0.005 to 0.5 wt % of one or two in total of lead and bismuth and 0.005 to 0.2 wt % in total of one or more of lithium, calcium and aluminum is used as the anode active material.

4. A method according to claim 1, wherein said indium salt is indium chloride or indium sulfate.

5. A method according to claim 1, wherein said indium salt is indium nitrate or indium sulfate, and said indium hydroxide or indium sulfide is prepared by neutralizing an aqueous solution of said indium salt containing chloride ions.

6. A method according to claim 1, wherein the powder of the indium hydroxide or indium sulfide prepared contains 60 wt % or more of particles having a particle size of 0.5 to 8 μm.

7. A method according to claim 1, wherein said indium hydroxide has a weight loss of 18 to 30 wt % when thermally decomposed at a temperature of up to 900° C.

8. A method according to claim 1, wherein said indium hydroxide has a powdery X-ray diffraction pattern having peaks at 4.71±0.10 Å, 3.98±0.02 Å, 3.57±0.10 Å and 2.66±0.02 Å.

9. A method according to claim 1, wherein, in addition to said indium hydroxide or indium sulfide, an alkali metal sulfide is added in an amount of 0.002 to 0.2 wt % based on the weight of said zinc alloy to said gel-like alkaline electrolyte.

10. A method of manufacturing a zinc-alkaline battery, which comprises dispersing a zinc alloy powder as an active material in a gel-like alkaline electrolyte to prepare a gel-like anode, said zinc alloy containing at least one alloying element selected from the group consisting of indium, lead, bismuth, lithium, calcium and aluminum and said alkaline electrolyte containing indium hydroxide or indium sulfide prepared from an indium salt as starting material by neutralizing an aqueous solution of said salt, said indium hydroxide or indium sulfide being contained in an amount of 0.005 to 0.5 wt % based on the weight of said zinc alloy and further containing a surfactant having a hydrophilic part of polyethylene oxide and an oleophilic part of a fluoroalkyl group in an amount of 0.001 to 0.1 wt % based on the weight of said zinc alloy.

11. A method according to claim 10, wherein the zinc alloy containing 0.01 to 1 wt % of indium and 0.005 to 0.5 wt % in total of one or two of lead and bismuth is used as the anode active material.

12. A method according to claim 10, wherein the zinc alloy containing 0.01 to 1 wt % of indium, 0.005 to 0.5 wt % of one or two in total of lead and bismuth and 0.005 to 0.2 wt % in total of one or more of lithium, calcium and aluminum is used as the anode active material.

13. A method according to claim 10, wherein said indium salt is indium chloride or indium sulfate.

14. A method according to claim 10, wherein said indium salt is indium nitrate or indium sulfate, and said indium hydroxide or indium sulfide is prepared by neutralizing an aqueous solution of said indium salt containing chloride ions.

15. A method according to claim 10, wherein the powder of the indium hydroxide or indium sulfide prepared contains 60 wt % or more of particles having a particle size of 0.5 to 8 μm.

16. A method according to claim 10, wherein said indium hydroxide has a weight loss of 18 to 30 wt % when thermally decomposed at a temperature of up to 900° C.

17. A method according to claim 10, wherein said indium hydroxide has a powdery X-ray diffraction pattern having peaks at 4.71±0.10 Å, 3.98±0.02 Å, 3.57±0.10 Å and 2.66±0.02 Å.

18. A method according to claim 10, wherein said alkaline electrolyte contains a surfactant having the formula $$(X)-C_nF_{2n}-(Y)-(CH_2CH_2O)_m-(Z)$$

wherein X is —H or —F, Y is —$C_2H_4$—O—$CH_2$CH(OH)—$CH_2$O—, —CONH or —$SO_2$NR wherein R is —H or an alkyl group, Z is —$CH_3$, —$PO_3W_2$ or —$SO_3W$ wherein W is an alkali metal, n is in the range of 4 to 10, and m is in the range of 20 to 100, in an amount of 0.001 to 0.1 wt % based on the weight of said zinc alloy.

19. A method according to claim 10, wherein said alkaline electrolyte contains a surfactant having the formula of $$(X)-C_nF_{2n}-(CH_2CH_2O)_m-(Z)$$

wherein X is —H or —F, Z is —$CH_3$—$PO_3W_2$ or —$SO_3W$ wherein W is an alkali metal, n is in the range of 4 to 10 and m is in the range of 40 to 100, in an amount of 0.001 to 0.1 wt % based on the weight of said zinc alloy.

20. A method according to claim 10, wherein in addition to said indium hydroxide or indium sulfide, an alkali metal sulfide is added in an amount of 0.002 to 0.2 wt % based on the weight of said zinc alloy to said gel-like alkaline electrolyte.

* * * * *